Patented Apr. 7, 1942

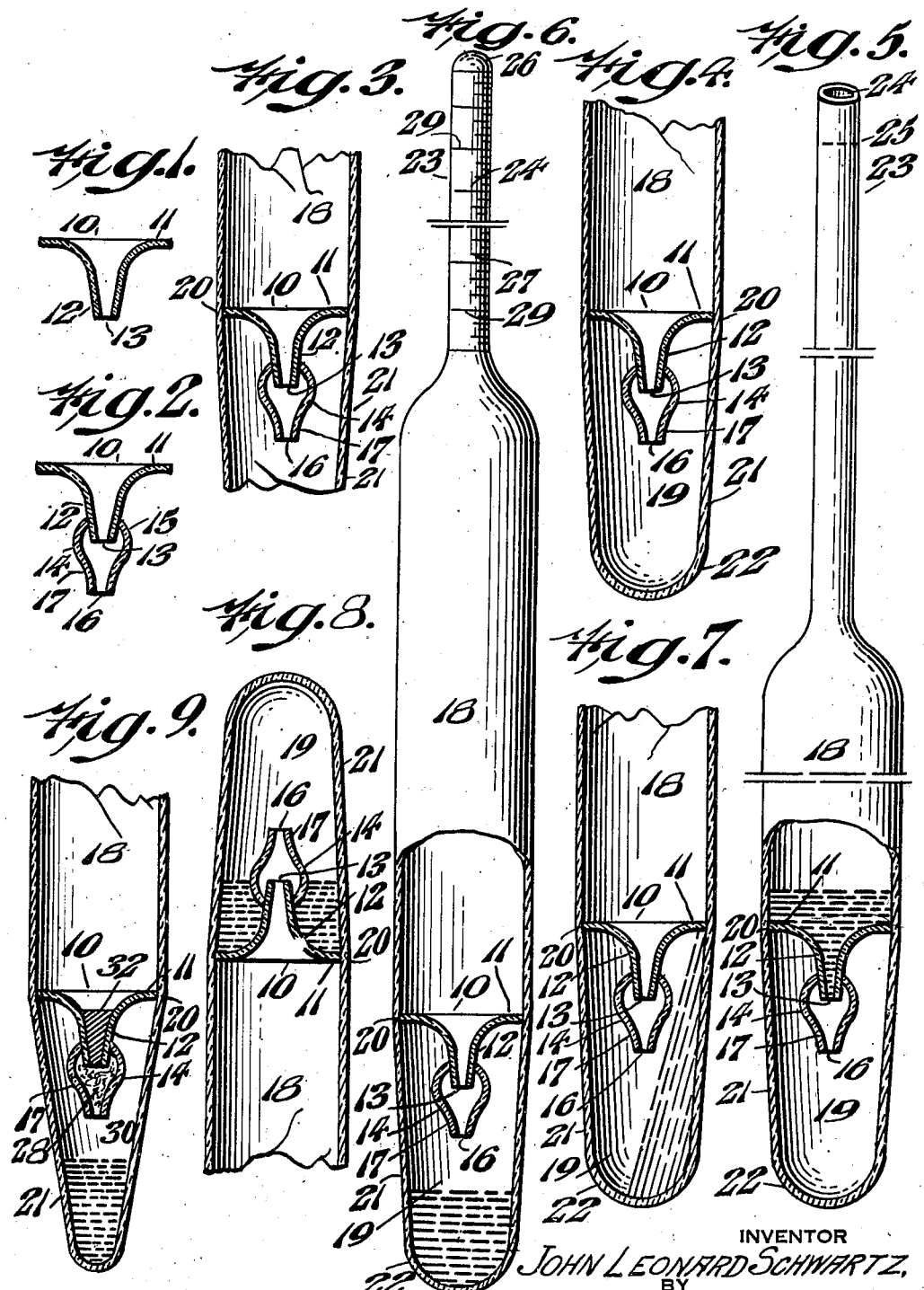

2,278,497

UNITED STATES PATENT OFFICE 2,278,497

HYDROMETER

John Leonard Schwartz, Philadelphia, Pa., assignor to Philadelphia Thermometer Company, Philadelphia, Pa., a partnership Application August 22, 1936, Serial No. 97,321

8 Claims. (Cl. 265—45)

This invention relates to hydrometers, and to a method of making same.

While there has been considerable activity in the past in the art of hydrometers, it is generally recognized at present that the preferred form is comprised of a tapered or rounded "wipeable" glass envelope containing a metallic weight, and, more specifically, that the weight is mercury. This is with full recognition of the fact that several efforts have been made to use solid weights, or shot or the like anchored or embedded in a plastic base in containers of various shapes. In the main, mercury is the preferred weight. As developed heretofore it has been necessary to form the glass envelope in such a manner that a compartment was provided in the lower end, which was first sealed to exclude water, then placed in water or the like test liquid, while a measured quantity of mercury was inserted from the top against the upper wall of the said lower compartment, until the desired mass was added that would cause the envelope to sink into the test liquid to a substantially predetermined position representing a predetermined density of liquid at a predetermined point of a scale. Then the measured quantity or volume of mercury was poured out into a temporary retaining receptacle while the previously sealed compartment was opened under the influence of heat by melting the extreme tip end thereof with, however, the necessity of leaving the glass content of the tip absolutely undisturbed in volume, else the weight might vary, to admit the said identical measured mercury from the temporary retaining receptacle into the unsealed end, after which the said extreme tip end was sealed again, under heat, with the mercury trapped in the compartment while it is being sealed. It will be obvious that the procedure as recited, or substantially as recited, involves a working and reworking of the glass under melting heat, with a consequent increase of cost and decrease of strength, and a handling and rehandling of the mercury comprised in the measuring of the mercury in the envelope itself, above the compartment, pouring it off into the temporary retainer, and the subsequent re-insertion in the compartment. Certainly the excessive labor cost and added chance of the mercury picking up impurities during the rehandling according to this procedure will be obvious.

A factor of interest in the prior art situation is that when the mercury is once inserted in the lower compartment of the envelope it is then too late to add any additional weight, so that the instrument so made has to be adapted to the desired condition or else completely reworked. Reworking, if feasible at all, comprises reheating the compartment to open the tip end then repeating all of the above noted steps. This is commercially impractical.

It is not generally known or publicly appreciated, but it is well established in glass blowing that the strength of glass diminishes each time it is worked or reworked under heat, and it is not to be wondered at that many of the hydrometers produced as above recited, are susceptible to fracture and disruption under working conditions, when they might not have done so if the excess reheating could have been avoided. So far as the prior art is concerned, in those devices using mercury with tapering envelops capable of being wiped dry with a single wipe, it was not possible to retain the full strength of the glass, and frequently strains engendered in the welding and fusing operations were such as ultimately to disrupt the devices. It was frequently possible to eliminate most of such strains by suitable annealing, but this was an extra step, required great care, and was done in the absence of the mercury so that the strain of the last reheating could never be dissipated.

It is among the objects of this invention; to improve the art of hydrometers; to obviate certain of the disadvantages of the prior art; to provide hydrometers of cheapness and efficiency; to provide a hydrometer of increased strength; to provide a hydrometer such that the mercury need only be poured once into the envelope; to provide a hydrometer by a reduced number of operations; to provide in a glass envelope a transverse baffle or panel and a generally tapering end with substantially a single heating; to fill a hydrometer with mercury after the mercury compartment is formed without handling the mercury more than once; to provide a hydrometer with an unsealed mercury compartment into which mercury can be introduced without melting any portion of the compartment; to provide a method of making and a method of filling hydrometers with mercury; to provide means to prevent or reduce oxidation of mercury in hydrometers; and many other objects and advantages of the invention will become more apparent as the description proceeds.

In carrying out the invention according to the preferred form thereof the glass envelope is provided with a transverse funnel-like member and a generally tapered end, and mercury is introduced from the top of the envelope through the funnel into the compartment between the funnel and the tapered end.

In the accompanying drawing forming part of this description:

Fig. 1 represents a vertical section through a form of transverse funnel like member such as is used to define the upper wall of the lower compartment of the instrument, Fig. 2 represents a vertical section through the preferred form of transverse funnel-like trapped member comprising a modification of the funnel member shown in Fig. 1, Fig. 3 represents a fragmentary vertical section through a hydrometer barrel with the transverse abutment secured therein prior to closing off the lower tip end of the barrel to define the mercury chamber, Fig. 4 represents a similar view of the hydrometer barrel of Fig. 3, with the lower tip end finished to form a wipeable terminal, Fig. 5 represents an elevation, partially in section, of a hydrometer according to this invention with the upper end of the neck or shank open and mercury disposed on the upper surface of the abutment as a preliminary to its disposition within the chamber, Fig. 6 represents an elevation, partially in section, of a completed hydrometer according to the invention, Fig. 7 represents a fragmentary section of the lower end of the hydrometer of Fig. 6, with the mercury illustrated as disposed as though the hydrometer was tilted, showing the preferred non-immersed disposition of the open end of the transverse abutment or funnel-like member relative to the mercury surface.

Fig. 8 represents a similar fragmentary section of the lower end of an inverted hydrometer, showing that the mercury surrounds the funnel-like member and rests upon it below the open mount thereof to minimize the chance of leakage through such mouth of the funnel, and Fig. 9 represents a fragmentary section through a modified form of hydrometer showing the funnel-like member sealed after the mercury is positioned in the lower compartment.

Hydrometers usually comprise a glass envelope having an enlarged lower end with which the weight is associated, merging into the slender upper end containing a chart bearing graduations according to the displacement of the hydrometers relative to certain liquids. In the interest of speed, and other requirements, there has developed, comparatively lately, a requirement in certain industries that the enlarged lower portion merge into a rounded or tapering lower end or terminal, without a break or a reduced neck connection or the like, which latter is difficult to wipe in a single movement. Such terminals have generally been effected heretofore by fusing a transverse imperforate disc, or an inverted imperforate cone into the cylindrical stock of the enlarged end of the hydrometer. While this melting was taking place the same heat was used to melt the cylinder beyond the baffle or disc to form a tapering end thereto below, extending oppositely to and spaced from, the transverse member, and the tapering end was then cut off, preferably, although not necessarily, while still being open. In a subsequent step or at the time of formation the tapering external open mouth or end is fused shut to exclude test liquid, and the glass envelope is dropped into such a test liquid with the upper end of the neck open, mercury is then dropped into the open mouth of the upper end coming to rest against the transverse baffle until the hydrometer sinks to a substantially predetermined point which is noted, after which the measured mercury is poured out, the sealed end is then fused open again, with such care as may be exercised to insure that the same amount of glass maintains, the measured mercury is again poured into the opened end against the other side of the baffle, then the end is sealed to seal the compartment containing the mercury. It is not possible to anneal the end after the mercury is inserted, so that the hydrometer if possessed of strains from the last heating inevitably retains them after the mercury is inserted so as to have a consequent tendency toward fracture.

In the preferred manner of constructing the hydrometer according to this invention, there is first provided a funnel-like member 10 having the enlarged upper end 11 of the same diameter, substantially, as the cylinder with which it is to be associated, to be described, and having the reduced preferably concentric spout 12 having a small orifice 13. The funnel as described may be used as shown, as in general it is difficult to get any mercury to pass upwardly through spout orifice 13, especially as the funnel mouth is preferably always out of immersed relation to the mercury, and if any of it does so pass it will run right down again as soon as the instrument is held upright. However, in the interests of avoiding any passage of mercury improperly through the funnel, and to furnish a sort of trap, to make it even more difficult to pass mercury the wrong way, trap element 14, having the upper bulbous portion 15 is so arranged as to be mountable upon the spout 12 remote from the end of orifice 13. The trap 14 terminates in a lower depending neck 15, of desired length having the orifice 16. It is preferred that the end of orifice 16 be so spaced from all of the surrounding wall material as to be always out of immersed relation to the mercury, regardless of how the instrument may be tilted. The arrangement of funnel 10 and trap 14 is preferably that the orifices 13 and 16 are substantially concentric, although obviously they may be eccentric so that mercury entering opening 16 will be incident upon the funnel 10 at a point offset from opening 13, although generally this is not necessary and the trapped funnel generically designated by character 17 as shown, will be used in the preferred embodiment of the invention.

The trapped funnel 17 usually made of glass is introduced axially into the section of cylindrical glass 18, and is fused transversely therein by melting the cylinder and funnel edge together at the annular line 20. Obviously the heat applied for this fusing operation can be continued vertically for a distance such as to melt or soften the lower end 21 of the section 18, so that it can be melted, shaped and fused together to form the tapered end 22. Obviously this end may be tapered or rounded or otherwise, as under the broader aspects of the invention, it is necessary merely to close the end of the cylinder and the end may be square if desired, although in the interests of efficiency it is preferred to cause it to be generally rounded off for the wiping purpose recited. Closing the lower end 22 of the cylinder 18 thus forms a mercury compartment 19 between the funnel 17 and lower terminal 22. The lower end of the hydrometer is now completed, and no particular regard need be paid to the question of the amount of glass in the lower end, nor to the future fusing reheating thereof, as was imperative in the prior art. At this point, if desired, the end of the instrument, shown in Fig. 4, may be annealed to remove any strains remaining as an incident to its formation.

The upper end of the cylindrical section 18 is reduced and drawn out to form the elongated neck 23 having the upper initially open end 24.

The elongated hydrometer envelope, having its only opening at the top, is now lowered into a test liquid, such as water, and metallic mercury is dropped into it from the top through mouth 24 until a desired amount is deposited upon the upper side of the funnel 10. The mercury preferably remains upon funnel 17 without passing through the orifice 13 thereof immediately, although this result will depend upon whether the orifice 13 is large enough to let the airbound mercury pass downwardly into the compartment 19. The mercury is added or subtracted freely through the upper open mouth 24, until the entire hydrometer assumes its proper position of displacement relative to the test liquid level, and a mark is made upon the neck 23, as at 25. The mark 25 may be the start of the calibrations, from which other approximate marks will be made, or relative to which accurate displacement records in other liquids of different densities may be made as indicated at 29 on chart 27 in Fig. 6. In any event, the required and desired amount of mercury having once been disposed in the envelope 18, remains therein without removal for any cause, and thus obviates one source of annoyance in the characteristic of mercury to pick up foreign matter during its handling and rehandling as is necessary in the prior art.

It has been noted that the orifice 13 and, of course, when used, orifice 16, is small, although the size generally makes but small difference, except to minimize the chance of the mercury coming upwardly into the upper compartment above the funnel. If the passage is larger the mercury may pass into the lower compartment 19 directly, as by shaking or by ordinary gravity flow. In the preferred case, however, the openings are relatively small so that the mercury needs to be urged through the openings. This is accomplished both expeditiously and cheaply by introducing suction to the upper end 24 of the casing, which exhausts or rarifies the air both in the upper end of the envelope and also in the lower mercury compartment 19, as will be obvious from the important fact that the said compartment is not sealed from the remainder of the envelope. After the air has been somewhat rarified, the vacuum is broken at the upper end of the neck and the incoming air sweeps the mercury downwardly through the funnel into the lower compartment 19. It is a feature of the invention that oxidation of the mercury be minimized, either by re-exhausting the air and then sealing the mercury compartment so that it is at less than atmospheric pressure, as by melting a drop of wax, or the like, in the mouth of funnel 10, or by exhausting the air and replacing it in the mercury compartment only with a gas that will prevent oxidation, such, for instance, as nitrogen. This is done, of course, prior to calibration. Chart 27, or the like, is introduced into the neck 23, and is done after the mercury is disposed within the mercury compartment 19. After the hydrometer has been calibrated and a chart made, it is secured in the neck 23, and the upper end 24 of the neck is sealed as at 26, the hydrometer is completed.

It is a feature to be stressed that the mercury insertion is made without any heating of the stress producing parts of the instrument. The fact that the whole lower end is heated but once, in place of the plural heatings of the prior art, is a very important item.

It is not preferred, but if desired it is possible to seal the funnel, as shown in Fig. 9, in which a funnel 17, as shown and described, is mounted as usual in cylinder 18, and so arranged that after the mercury has passed downwardly into the compartment 30, the bulb 14 is stuffed with cotton, or the like, 28, which is held in place by a drop of wax or other fuseable or suitable material 32 dropped in from the upper end (not shown). Obviously this wax 32 could be melted by a gentle application of heat externally of the hydrometer, while exhausting the mercury compartment of air, then the hardening of the wax would effectively seal same against the passage of air, to minimize oxidation as previously discussed.

It is a further feature of importance that the relation of the walls defining compartment 19, to the lower or depending tip end 15 of the funnel 17 is such that the said tip end is out of immersed relation thereto as has been discussed. In other words, as shown in Figs. 7 and 8, the mercury flows around the inner walls of the compartment 19 in any adjusted position to which it may be moved, without impinging against the end of the said tip. There can therefore be no accidental movement of mercury backwards, or upwardly or downwardly out of the compartment 19. If it is shaken so as deliberately to try to cause it to move past the trap and into the upper compartment then it will run downwardly back again into the lower compartment as soon as it is positioned in the liquid to be tested. This may be stated as the fact that the clearance between the funnel tip and the surrounding wall areas is always greater than the depth of mercury in the clearance.

The simplicity, economy and strength of the invention are thought to be obvious.

I claim:

1. In hydrometers, a body portion, a funnel fused thereto transversely thereof, a portion of the body portion beyond the funnel fused into a round end spaced from the funnel to form a mercury compartment, mercury in the compartment, the end of the funnel spaced from the surrounding walls by a clearance such as to keep the tip of the funnel out of immersed relation to the mercury in all stationary adjusted positions of the body.

2. In hydrometers, a body portion of generally cylindrical form, a continuation of the body rounded off into a transverse imperforate member, a secondary tapering transverse member secured to the body and having a portion extending toward and within but spaced from said rounded end so as to define a mercury chamber, said secondary member being so shaped and extending into the mercury chamber sufficiently far as to disperse the mercury during shock so as to divide the mercury and to direct the impact toward the periphery of the secondary member.

3. The method of weighting the lower end of an hydrometer of the type having a tapering partition terminating in a small orifice and forming upper and lower chambers in communication through the orifice in the partition, which consists in introducing a gaged quantity of mercury into the upper chamber to rest upon the partition, in subjecting the upper surface of the mercury to greater fluid pressure than exists in the lower chamber to move the mercury into the lower chamber, supporting a fusible sealing substance on the partition in position to run into such orifice when fused, evacuating both chambers, heating the partition and fusing such substance during maintenance of the vacuum in both chambers, permitting the partition to cool while maintaining the vacuum in both chambers whereby the substance solidifies in and hermetically seals the orifice to maintain a vacuum in the lower chamber containing the mercury.

4. The method of weighting the lower end of an hydrometer of the type having a tapering partition terminating in a small orifice and forming upper and lower chambers in communication through the orifice in the partition, which consists in introducing a gaged quantity of mercury into the lower chamber, supporting a fusible sealing substance on the partition in position to run into such orifice when fused, evacuating both chambers, heating the partition and fusing such substance during maintenance of the vacuum in both chambers, permitting the partition to cool while maintaining the vacuum in both chambers whereby the substance solidifies in and hermetically seals the orifice to maintain a vacuum in the lower chamber containing the mercury.

5. The method of weighting the lower end of an hydrometer of the type having a tapering partition terminating in a restricted orifice and forming upper and lower chambers in communication through the orifice in the partition without setting up undue stresses and strains in the hydrometer, which consists in introducing a gaged quantity of mercury into the lower chamber through the orifice in the partition, disposing fusible material on the sloping surface of the partition, heating the partition to fuse the material to cause it to run into said orifice, then cooling the partition to cause the material to solidify in the orifice to hermetically seal the mercury in the lower chamber.

6. The method of weighting the lower end of an hydrometer of the type having a tapering partition terminating in a small orifice and forming upper and lower chambers in communication through the orifice in the partition, which consists in introducing a gaged quantity of mercury into the upper chamber to rest upon the partition, in subjecting both the upper and lower chambers to evacuation and then in breaking the vacuum in the upper chamber to permit atmospheric pressure to force the mercury through the orifice in the partition into the lower chamber, supporting a fusible sealing substance on the partition in position to run into such orifice when fused, evacuating both chambers, heating the partition and fusing such substance during maintenance of the vacuum in both chambers, permitting the partition to cool while maintaining the vacuum in both chambers whereby the substance solidifies in and hermetically seals the orifice to maintain a vacuum in the lower chamber containing the mercury.

7. A hydrometer comprising a barrel float body having a longitudinal axis and a closed end, a funnel having an edge joined to the body in an annular line and forming a transverse partition in the body in spaced relation to the closed end to divide the float into upper and lower compartments, mercury partially filling the lower compartment, said funnel terminating centrally in a spout extending into the lower compartment and having a restricted mouth opening disposed in the lower compartment in axially spaced relation to said line and spaced from the side walls and closed end of the body and out of immersed relation to the mercury in a fixed vertical position of the body and thereby forming a trap against flow of mercury from the lower to the upper compartment.

8. A hydrometer comprising a barrel float body having a longitudinal axis and a closed end, a funnel having an edge joined to the body in an annular line and forming a transverse partition in the body in spaced relation to the closed end to divide the float into upper and lower compartments, said funnel terminating centrally in a spout extending into the lower compartment and having a restricted mouth opening disposed in the lower compartment in axially spaced relation to said line and spaced from the side walls and closed end of the body, mercury of smaller volume than the lower compartment disposed in and partially filling said lower compartment, the remaining volume of the lower compartment being filled with gas of reduced oxygen content compared to the same volume of atmospheric air, the restricted mouth opening of the spout being out of immersed relation to the mercury in a vertical position of the body so as to form a trap against movement of mercury from the lower to the upper compartment, and means sealing the funnel and the lower compartment hermetically from the upper compartment to prevent increase of oxygen content of said gas in the lower compartment to minimize oxidation of said mercury.

JOHN LEONARD SCHWARTZ.